United States Patent [19]

Bertetti

[11] 4,103,543

[45] Aug. 1, 1978

[54] METHOD AND APPARATUS FOR DETERMINING VEHICLE FUEL CONSUMPTION

[76] Inventor: John W. Bertetti, 2215 San Jacinto, Pasadena, Tex. 77502

[21] Appl. No.: 727,417

[22] Filed: Sep. 29, 1976

[51] Int. Cl.² .............................................. G01L 3/26
[52] U.S. Cl. .................................................... 73/114
[58] Field of Search ................................... 73/114, 113

[56] References Cited

U.S. PATENT DOCUMENTS

| | | | |
|---|---|---|---|
| 2,697,939 | 12/1954 | Martin et al. | 73/113 |
| 2,927,461 | 3/1960 | Welch et al. | 73/113 |
| 3,018,923 | 1/1962 | Michie | 73/114 |
| 3,549,868 | 12/1970 | Watson et al. | 73/114 |
| 3,635,079 | 1/1972 | Tomlinson | 73/114 |

Primary Examiner—Anthony V. Ciarlante
Attorney, Agent, or Firm—Bard, Springs, Jackson & Groves

[57] ABSTRACT

A method and apparatus for deriving the fuel consumption ratio of a motor vehicle by delivering a preselected quantity of fuel to operate the motor, measuring the distance the vehicle travels on the fuel supplied and displaying the measured distance in units of distance traveled to fuel consumed, such as miles per gallon or the like. Fuel delivery and distance measurement are simultaneously initiated manually and are simultaneously terminated automatically upon completion of fuel delivery with the measured distance remaining displayed until the apparatus is reset.

5 Claims, 3 Drawing Figures

METHOD AND APPARATUS FOR DETERMINING VEHICLE FUEL CONSUMPTION

BACKGROUND OF THE INVENTION

The present invention relates to measurement methods and apparatus for taking ratios, and more particularly to a method and apparatus for determining the ratio of miles travelled to fuel consumed, hereinafter called the fuel consumption ratio, for an automobile or the like.

Many operators of motor-driven vehicles are interested in fuel economy, and make it a practice to calculate the fuel consumption ratio as an indication of the efficiency of the vehicle. Further, the fuel consumption ratio is obviously related to the driving habits of the operator and the condition of the vehicle. For this reason, many operators employ a fuel consumption ratio indicator as an aid to efficient operation of the vehicle.

In the prior art, many devices have been provided for measuring and indicating the fuel consumption ratio of a vehicle and, in general, have been directed to continuously operating systems which provide an instantaneous value of the ratio. For example, one typical device, shown in U.S. Pat. No. 2,803,400, functions to continuously measure the distance travelled per unit of time and the quantity of fuel consumed per unit of time, thereby providing two variable rates. The device continually divides one rate by the other to derive an instantaneous quotient which is then displayed as the fuel consumption ratio. Systems of this general type tend to vary only in the methods utilized to obtain the variable rates for the distance travelled and the fuel consumed and to derive the instantaneous quotient.

The problem with such devices is that the indications provided fluctuate extensively during operation due to the fact that the fuel consumption ratio parameter is a quotient derived from variable parameters which can vary widely for a particular vehicle, depending upon the environment and manner of operation. For example, the fuel consumed during the given time period is determined by a number of variables among which are speed, rate of acceleration, atmospheric conditions, the terrain over which the vehicle is travelling, and the manner in which the vehicle is operated. Small changes in any of these variables can cause corresponding changes in the fuel consumed and when taken in combination can cause wide changes in the amount of fuel consumed under different operating conditions.

The distance travelled during the given time period parameter, while relatively more stable than the fuel consumed parameter, is also affected by speed, rate of acceleration, and, to some degree, the manner in which the vehicle is operated. Again, changes in these variables cause corresponding changes in the distance travelled parameter.

Since the fuel consumption ratio is a quotient derived from the distance and fuel parameters, it can be seen that small changes in any of the above-mentioned variables can cause disproportionate changes therein. Thus, while displaying the instantaneous value of a parameter is useful when the parameter is relatively stable or changes at a slowly varying rate, the use of such a continuously operating system for providing an instantaneous value of the fuel consumption ratio, which is rapidly changing, results in a widely fluctuating indication of the ratio. These fluctuations can be annoying to a vehicle operator, who must divert attention from vehicle operation to the fluctuating indicator to derive any meaningful data, concerning the fuel consumption ratio, which will aid in more efficiently operating the vehicle, such as reducing speed, foregoing rapid accelerations and similar fuel saving methods that can be instituted by a change in vehicle operation.

In recognition of the above-mentioned problem, several prior art devices have been directed to systems for providing a relatively stable indication of the instantaneous value of the fuel consumption ratio. For example, one method, as shown in U.S. Pat. No. 3,379,055, that has been used to overcome the widely fluctuating indication is to provide the indicator with a brake which is used to hold the indicator in a steady position during the time required for consumption of a preselected quantity of fuel, after which time the brake is released momentarily to allow the indicator to provide a new reading. While preventing the continuous fluctuation of the indicator, this method still results in wide fluctuations of the indicator during the interval the indicator brake is released. Again, these fluctuations divert the attention of the vehicle operator from operation of the vehicle.

Another prior art system, shown in U.S. Pat. No. 3,405,554, overcomes the difficulty in reading the widely fluctuating variations in the fuel consumption ratio indication by plotting separate indications, for the distance and fuel consumed measurements, on a two dimensional scale, whereby one measurement indication establishes a location on the scale in one dimension while the other measurement indication establishes a location in the other dimension, thereby providing two values which, taken jointly, indicate the fuel consumption ratio. While providing easily read indications of the fluctuating measurements, this system requires that the vehicle operator integrate the two indications to derive any data meaningful to aid in efficient operation of the vehicle, again diverting attention from vehicle operation.

Thus, to use the fuel consumption ratio indicators heretofore provided, as an aid to efficient vehicle operation, the operator must divide his attention between operating the vehicle and monitoring the fuel consumption ratio indication. This would reasonably explain why such systems have not found wider usage.

To overcome the disadvantages in the prior art, it is a feature of the present invention to provide a stable indication of the fuel consumption ratio which may be utilized by the vehicle operator as an aid to more efficient operation of the vehicle and which does not detract the operator's attention from vehicle operation.

Another feature of the invention is to provide an improved method and apparatus for obtaining the fuel consumption ratio whereby a distance measurement is made during the period of time a vehicle operates on a preselected quantity of fuel, thereby averaging the ratio over the time period.

A further feature of the invention is to provide a continuous display of the ratio whereby the vehicle operator is not required to repeatedly monitor the display to obtain useful fuel consumption data.

SUMMARY OF THE INVENTION

An ideal embodiment of the present invention comprises a fuel metering assembly, a distance measuring circuit, and a calculator having an indicator, wherein the metering assembly is interconnected with a fuel line extending from a fuel supply to the motor portion of a vehicle for diverting normal fuel flow from the motor and delivering therefor a preselected quantity of fuel. The distance measuring circuit is interconnected with a rotating cable normally associated with a vehicle speedometer for measuring the distance the vehicle travels during delivery of the preselected quantity of fuel, and the calculator is interconnected with the distance measuring circuit for recording the distance travelled during delivery of the preselected quantity of fuel and indicating that distance as a ratio of distance travelled to fuel consumed.

In this embodiment, the fuel metering mechanism preferably comprises a chamber containing a flexible diaphragm dividing the chamber into first and second defined compartments, with each compartment having a port interconnected to the fuel line to permit ingress and egress of fuel into and from each compartment. A valve is interposed in the fuel line, between the interconnections of the ports with the fuel line, and has a first position allowing fuel to flow from the fuel supply to the motor portion of the vehicle and, additionally, maintain a preselected quantity of fuel in the second compartment. Further, there is provided a second position for diverting fuel from the motor portion of the vehicle into the first compartment of the chamber, thereby moving the diaphragm into the second compartment and displacing the preselected quantity of fuel through the interconnecting port and fuel line to the motor portion of the vehicle.

The distance measuring circuit comprises a magnetic reed switch interposed in a conductor providing a current path to the calculator. The reed switch is positioned in proximity to the rotating cable of the speedometer and further has a magnet interconnected to the cable for rotating the magnet at a rate representative of the distance travelled by the vehicle during delivery of the preselected quantity of fuel. This rotation brings a pole face of the magnet in proximity with the reed switch once each rotation of the magnet is completed thereby momentarily closing the reed switch and providing a momentary path for current flow to the calculator. A current impulse is generated thereby and then received by the calculator which increments the associated indicator by a preselected amount. Additionally, a normally open switch is interposed in the current path to the calculator to maintain the distance measuring circuit in an inactive state.

This arrangement allows fuel to normally bypass the metering mechanism until such time as a fuel consumption ratio determination is desired. At that time the valve is moved to the second position, diverting fuel into the first compartment of the chamber for displacing the preselected quantity of fuel from the second compartment. Simultaneous with the repositioning of the valve to the second position, the normally open switch interposed in the current path to the calculator is closed, allowing the magnet and reed switch combination to provide a series of impulses, representative of the distance travelled by the vehicle during delivery of the preselected quantity of fuel, to the calculator to increment the indicator. When the preselected quantity of fuel has been displaced, a circuit coupled to the flexible diaphragm returns the valve to the first position, restoring normal fuel flow to the motor portion of the vehicle, and opens the normally-open switch in the current path provided to the calculator. The indicator continues thereafter to display the ratio of the distance travelled to fuel consumed during the delivery of the preselected quantity of fuel. This display will remain until such time as the vehicle operator resets the apparatus prior to initiation of another fuel consumption ratio determination.

IN THE DRAWINGS

DETAILED DESCRIPTION

Figure 1:
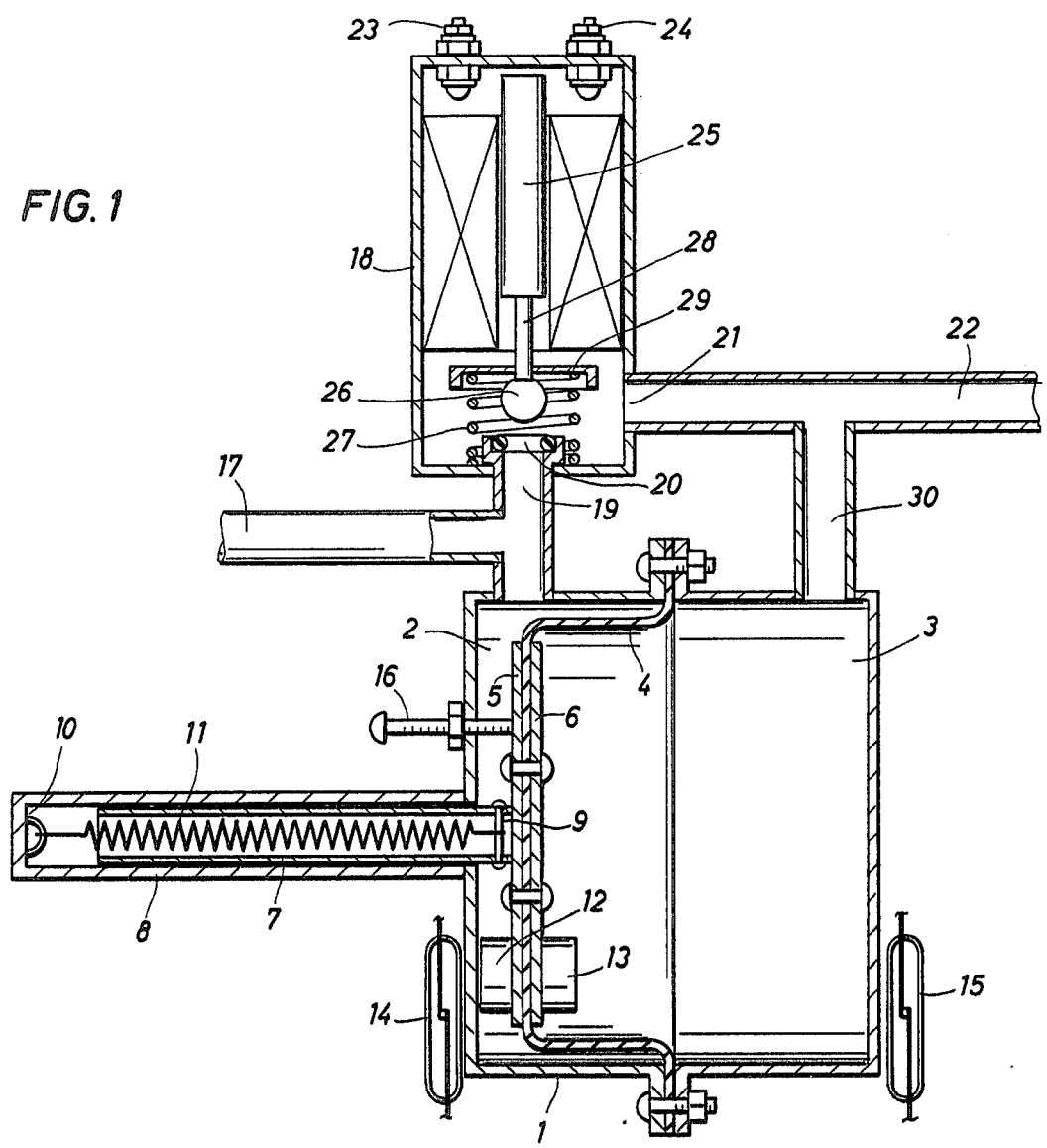
FIG. 1 is a simplified diagrammatic view of the measuring chamber and solenoid by-pass valve.

Referring to FIG. 1, two cup-shaped sections 2 and 3 are joined to form a cylindrical measuring chamber 1 and are fabricated from non-magnetic material such as brass or aluminum. A flexible diaphragm 4 is affixed between the ends of cup sections 2 and 3, which have been joined to form chamber 1, constituting a seal between sections 2 and 3. Two non-magnetic rigid discs 5 and 6 are affixed to opposing sides of flexible diaphragm 4 with disc 5 positioned on the section 2 side of diaphragm 4 and disc 6 positioned on the section 3 side. To disc 5 is affixed a hollow tubing guide 7 which slides in companion tubing guide 8 affixed to an opening provided in section 2. This guide serves to maintain discs 5 and 6 in position substantially normal to the longitudinal dimension of chamber 1. Attached at one end to a pin 9, located in guide 7 and adjacent to disc 5, and at the remaining end to the closed end 10 of tubing guide 8 is a coil spring 11. Spring 11 tends to hold discs 5 and 6 drawn to the enclosed end of section 2 of the measuring chamber. Adjustable stop 16 serves to adjust the distance to which discs 5 and 6 may be drawn by spring 11.

Attached to discs 5 and 6 are flat permanent magnets 12 and 13 respectively. Exterior of the chamber and adjacent to magnet 12 is an electrical, magnetic, sealed-in-glass, normally open reed switch 14. This switch is in a closed position when magnet 12 is adjacent thereto but opens as magnet 12 is moved from proximity of switch 14. On the opposite end of the measuring chamber is a second magnetic reed switch 15. Switch 15 is normally in closed position, but opens when approached by permanent magnet 13.

When no distance-to-fuel ratio determination is being made, fuel from the vehicle fuel pump enters conduit 17, then enters the open push-type electric solenoid valve 18 through valve port 19, passes through valve seat 20, leaves the valve through port 21, and passes to the vehicle engine through conduit 22.

When a ratio determination is being made, solenoid valve 18 is energized and closed. Fuel from conduit 17 enters section 2 of the measuring chamber, forcing discs 5 and 6 towards the opposite end of the chamber notwithstanding the resisting force of spring 11. Simultaneously an equal volume of fuel is forced out of section 3 through conduits 30 and 22 to the vehicle engine.

When the solenoid of totally enclosed, push-type, valve 18 is energized through insulated connections 23 and 24, armature 25 is forced downward, forcing the valve plunger ball 26 against valve seat 20 in opposition of the resisting forces of return spring 27 and the upward flow of fluid through the valve. Connecting member 28 and spring retainer 29 are preferably of non-magnetic material.

Because of the relatively large cross-sectional area of the measuring chamber, relatively little differential pressure is required to force the diaphragm forward, typically less than 1 pound per square inch.

As the diaphragm approaches the opposite end of the chamber, permanent magnet 13 approaches reed switch 15. When sufficiently close, magnetic action opens reed switch 15 and, by action through a relay, opens the electrical circuit to solenoid valve 18. With solenoid valve 18 deenergized, return spring 11 and the differential fuel pressure across the two sections of the measuring chamber force the ball 26 away from valve seat 20, that is, the valve opens.

Because of the relatively low pressure drop through the open solenoid valve, the action of return spring 11 draws the chamber diaphragm back to its original position, forcing fuel from section 2 through the open solenoid valve and drawing fuel into section 3.

When the diaphragm and attached permanent magnet 12 moved away from the proximity of reed switch 14, the switch contacts separated. As the diaphragm returns to its original position, switch 14 again closes and electrically actuates a signal signifying that the apparatus is in position for another determination.

Figure 2:
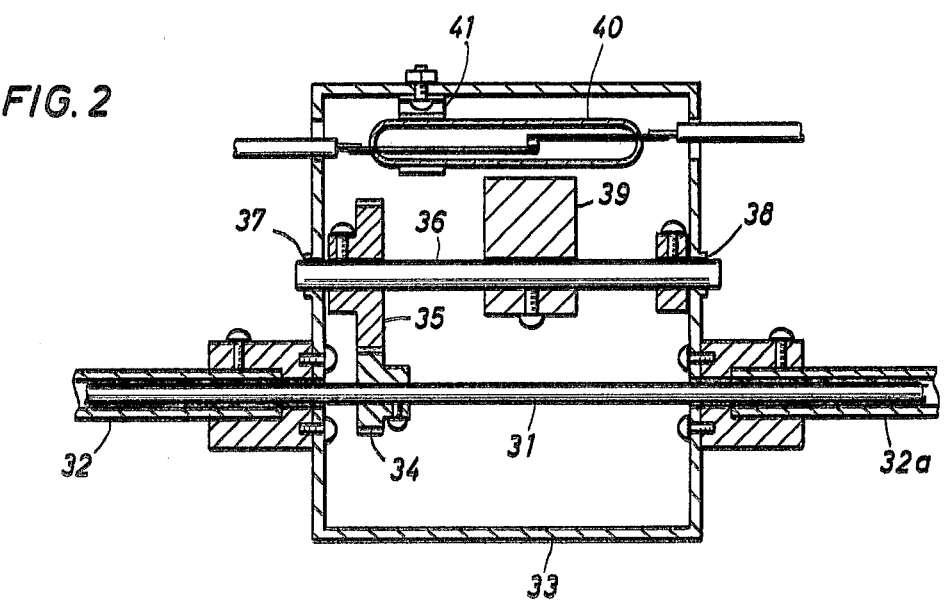
FIG. 2 is a simplified diagrammatic view of a distance travelled measuring element.

FIG. 2 shows diagrammatically apparatus for transmitting an electrical pulse at each predetermined increment of travel of the motor vehicle. Rotating shaft 31 is the conventional flexible cable of a motor vehicle associated with its speedometer and odometer, or mileage recorder. The conventional flexible sheath 32 and 32a of the cable may be cut at some convenient location and a short section removed to provide for interposition of the distance travelled signal generator 33. Rigidly attached to cable 31 is a driving gear wheel 34 meshing with a driven gear wheel 35, in turn rigidly attached to a spindle 36 which is free to rotate in spindle bearings 37 and 38. Gear wheel 34 is provided with some suitable number of teeth, for example ten. It will usually be desired to have spindle 36 rotating at a slower rate than cable 31, so that driven gear 35 will be provided with a greater number of teeth than gear 34, for example fifty teeth to provide a step-down ratio of five.

Also rigidly attached to spindle 36 is a bar permanent magnet 39 so disposed with respect to magnetic reed switch 40 as to have one pole face come into close proximity to the switch with each revolution of spindle 36. Switch 40 is rigidly attached to the frame of transmitter 33 with suitable clips, such as 41 for example. The bar magnet thus causes the normally open contacts of switch 40 alternately to close and to open with each revolution of spindle 36. With suitable electrical wiring, the transmitter thus transmits an electrical pulse with each revolution of spindle 36, and, accordingly, with each preselected increment of travel of the motor vehicle.

Figure 3:
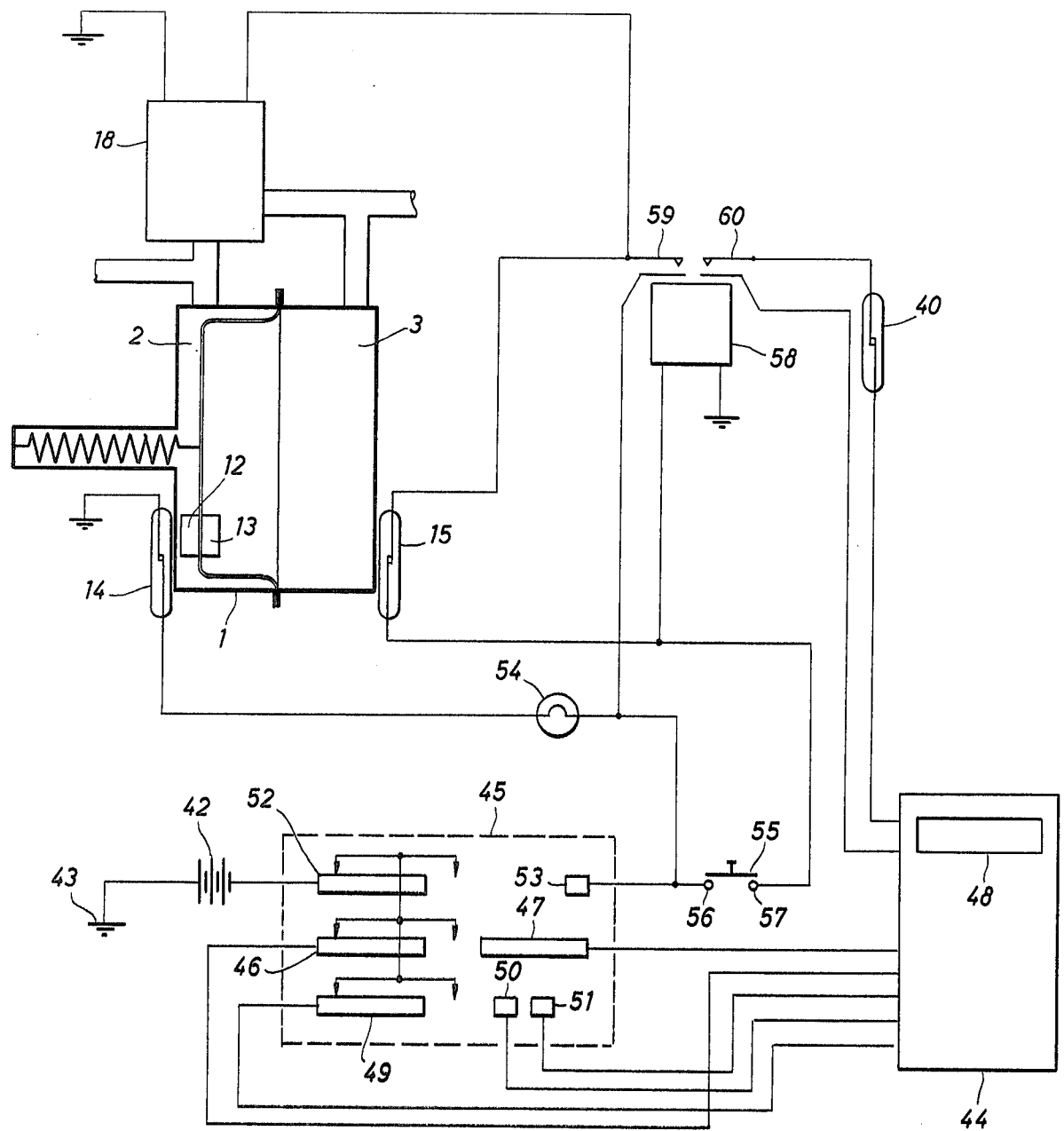
FIG. 3 is a simplified wiring diagram of the entire assembly, illustrating the measuring chamber, by-pass valve, calculator, and associated display.

FIG. 3 is a simplified schematic electrical wiring diagram of the apparatus as a whole, except that only reed switch 40 is shown as the pertinent portion of the distance travelled signal generator 33. Electrical power for the system is provided by the usual battery 42 of a motor vehicle. The battery customarily has one terminal grounded, 43, to the chassis and engine. For the purpose of illustration it is assumed that electrical power for the calculator 44 is furnished by self-contained batteries, although the calculator may be arranged to obtain power from battery 42.

It is convenient, although not essential, that 0.1 be added to the calculator display for each pulse transmitted by the distance measuring apparatus 33, so that the final display of miles per gallon will be to the nearest 0.1. Accordingly, a fixed relationship will exist between (I) the volume of fuel, $g$, consumed in each determination, (II) the distance travelled, $d$, with each revolution of the odometer cable 31, and (III) the gear ratio, $R$, between gears 35 and 34. This relationship may be expressed mathematically as $$(5280/d)(g/R) = 10$$

in which $d$ is in feet and $g$ is in gallons.

By way of example, assume that for a particular motor vehicle the distance travelled with each revolution of odometer cable 31 is 7.4 feet, representing one revolution of the vehicle wheel to which the directly driven cable is attached. Assuming a convenient ratio of 5 between gear wheels 35 and 34, the required volume of $g$ is found to be 0.070 gallon, or about 1/14 gallon. Thus, measurement chamber 1 is to be designed to deliver approximately this volume, with final calibration after assembly by adjustment of variable stop 16, within the limit of the effectiveness of the magnetic field of magnet 12 in acting on reed switch 14. Further adjustment may be made by varying the location on reed switch 15 with respect to the end of the chamber, again within the limit of effectiveness of magnet 13 in acting on reed switch 15.

In a typical operating sequence, referring to FIG. 3, three-element, slide switch 45 is first moved to the right, that is, to its ON position. In so doing contacts 46 and 47 are first bridged, energizing the calculator 44 and causing its display element 48 to display the number 0. As the slide is moved further toward its full ON position, contacts 49 and 50 are bridged momentarily and then contacts 49 and 51 are bridged momentarily. These momentary bridgings cause the calculator display to change to 0.1. On moving slide switch 45 to its full ON position, contacts 52 and 53 are bridged. This action causes signal lamp 54 to light since, before initiating a determination, the contacts of reed switch 14 are normally closed.

A determination may now be initiated by manually depressing normally open push-button switch 55. The momentary closing of contacts 56 and 57 energizes relay 58, causing normally open contacts 59 and 60 to close. Current then flows from the battery 42 through contact 59 and through normally closed reed switch 15, and thence to the energizing coil of relay 58, holding contacts 59 and 60 in closed position.

The closing of contact 60 activates the mileage counting system comprising (a) the distance travelled signal generator 33 with its magnetic reed switch 40, and (b) the calculator. Also on depressing initiation switch 55, energizing electrical power is transmitted to solenoid valve 18 and the valve closes. As fuel flows into section 2 of measurement chamber 1, forcing the diaphragm toward the opposite end, the calculator display is advancing 0.1 with each impulse from reed switch 40.

When permanent magnet 13 is sufficiently near reed switch 15 to cause its contacts to open, the predetermined volume of fuel will have passed from section 3 of the measurement chamber to the engine. The opening of reed switch 15 causes relay 58 to be deenergized. Contacts 59 and 60 immediately open, simultaneously deenergizing solenoid valve 18, causing it to open, and deenergizing the mileage counting circuit through reed switch 40. The calculator display at this point shows the average miles per gallon obtained by the vehicle during consmption of the increment of fuel delivered from section 3 of the measurement chamber. This display will remain until slide switch 45 is pushed to its OFF position.

Modification of the particular elements of apparatus can of course be made by those skilled in the art without departing from the basic concepts of the invention. For example, a bellows or close fitting piston may be substituted for the flexible diaphragm 3. Also, mechanical means responsive to the position of the diaphragm, or substituted element, may be used for actuating a valve replacing solenoid valve 18. Furthermore, a mechanical counting device may be substituted for the calculator.

What is claimed is:

1. Apparatus for indicating the ratio of fuel consumption to distance travelled in a vehicle having a motor, a fuel supply and a fuel line extending between said motor and said supply, comprising
   container means having an internal fuel-filled chamber and first and second ports interconnecting said chamber with said fuel line,
   a movable wall member disposed in said container means for dividing said chamber into a first compartment interconnected with said first port for receiving fuel from said fuel line and a second separate compartment interconnected with said second port for supporting and discharging a preselected quantity of fuel into said fuel line,
   valve means interconnected with said fuel line and normally positioned to permit fuel flow to by-pass said container means and alternatively positionable to divert fuel flow from said supply to said first port and into said first compartment in said container means to displace said preselected quantity of fuel from said second compartment therein through said second port and said fuel line to said motor,
   metering means for generating discrete impulses functionally related to predetermined increments of distance travelled by said vehicle during said displacement of said preselected quantity of fuel,
   counting means responsive to said metering means for counting the number of said discrete impulses generated by said metering means during said displacement of said preselected quantity of fuel to said motor and for providing a visible representation of said number of discrete impulses counted thereby indicating the ratio of fuel consumed to distance traveled,
   first actuating means interconnected to said valve means and to said metering means and energizable for positioning said valve means to said alternative position to divert said fuel flow from said supply to said first port and instituting generation of said discrete impulses simultaneously therewith,
   second actuating means interconnected to said first actuating means and responsive to manual initiation for energizing said first actuating means, and
   means interconnected with said movable wall and responsive to said displacement of said preselected quantity of fuel for deactuating said first actuating means for interrupting generation of said discrete impulses and for repositioning said valve means to said position for allowing said fuel flow to normally by-pass said chamber means simultaneously therewith.

2. The apparatus described in claim 1 and further including means for selectively positioning said movable wall member disposed in said container means to establish said preselected quantity of fuel in said second compartment of said container means when said valve means is positioned to allow said fuel flow to normally by-pass said container means.

3. The apparatus described in claim 1 and further including fuel replacement means interconnected with said movable wall member and responsive to said displacement of said preselected quantity of fuel for restoring said preselected quantity of fuel displaced from said second chamber of said compartment means by said fuel flow diverted into said first chamber of said container means.

4. The apparatus described in claim 1 and further including switch means interconnected with said counting means for alternatively manually setting said visible representation of said number of discrete impulses counted to a preselected value prior to said counting means counting said discrete impulses and providing said visible representation of said number of discrete impulses counted.

5. The apparatus described in claim 1 wherein said metering means comprises pulsing means interposed between a rotating cable such as is normally associated with a distance measuring device generally associated with a vehicle and said counting means for producing a discrete electrical pulse functionally related to a predetermined increment of distance travelled by said vehicle and upon completion of at least each single rotation of said rotating cable, said discrete electrical pulse coupled to said counting means for incrementing said visible representation a preselected amount upon receipt of each said discrete electrical pulse.

* * * * *